US010357051B1

(12) United States Patent
Zietlow et al.

(10) Patent No.: US 10,357,051 B1
(45) Date of Patent: Jul. 23, 2019

(54) METHOD AND SYSTEM FOR PRODUCING GLUTEN-FREE OATS

(71) Applicant: General Mills, Inc., Minneapolis, MN (US)

(72) Inventors: Philip K Zietlow, Wayzata, MN (US); Daniel J Winderl, Plymouth, MN (US); Jay Romsa, North Mankato, MN (US); Kara M Hobart, New Hope, MN (US); John M Hellweg, Minnetonka, MN (US); Troy D Bierbaum, Brooklyn Park, MN (US)

(73) Assignee: General Mills, Inc., Minneapolis, MN (US)

( * ) Notice: Subject to any disclaimer, the term of this patent is extended or adjusted under 35 U.S.C. 154(b) by 1605 days.

(21) Appl. No.: 13/673,193

(22) Filed: Nov. 9, 2012

(51) Int. Cl.
*A23L 7/10* (2016.01)
*A23L 7/143* (2016.01)
*A23L 7/148* (2016.01)

(52) U.S. Cl.
CPC .............. *A23L 7/197* (2016.08); *A23L 7/148* (2016.08); *A23L 7/10* (2016.08); *A23L 7/143* (2016.08)

(58) Field of Classification Search
CPC .......... A23L 7/148; A23L 7/143; A23L 7/197; A23L 7/10
USPC ........................................................ 426/481
See application file for complete search history.

(56) References Cited

U.S. PATENT DOCUMENTS

| 45,796 | A | 1/1865 | Ogborn |
| 178,257 | A | 6/1876 | Snavely et al. |
| 183,059 | A | 10/1876 | Leach |
| 209,208 | A | 10/1878 | Allonas |
| 677,789 | A | 7/1901 | Nagel |
| 788,839 | A | 5/1905 | MacDonald |
| 896,891 | A | 8/1908 | Campbell |
| 985,696 | A | 2/1911 | Pearce |
| 988,707 | A | 4/1911 | Hedfeldt |
| 1,179,875 | A | 4/1916 | Venus |
| 1,327,193 | A | 1/1920 | Braddy |
| 1,339,161 | A | 5/1920 | Bryan |
| 1,356,043 | A * | 10/1920 | Cowan .......................... 209/266 |
| 1,398,162 | A * | 11/1921 | Stansbury ......................... 209/7 |
| 1,974,309 | A | 9/1934 | Jones |
| 2,125,812 | A | 8/1938 | Robertson |
| 2,864,702 | A * | 12/1958 | Murray et al. ................ 426/619 |
| 3,833,118 | A | 9/1974 | Gilmore et al. |
| 3,901,725 | A | 8/1975 | Bond et al. |

(Continued)

FOREIGN PATENT DOCUMENTS

GB           855597  A  *  12/1960  ............... B02B 3/08

*Primary Examiner* — Lien T Tran
*Assistant Examiner* — Tynesha L McClain-Coleman
(74) *Attorney, Agent, or Firm* — Diederiks & Whitelaw, PLC; Gregory P. Kaihoi, Esq.

(57) ABSTRACT

A method and system for removing foreign grains from oat grains to establish gluten-free oats, i.e., oat grains having gluten levels below 20 ppm and, more preferably, below 10 ppm relies upon performing a series of differentiation operations on a combination of grains, including oats and foreign, or gluten containing, grains, followed by a re-shaping operation to compress the oat grains but not the foreign grains. Thereafter, the compressed oat grains are separated from the foreign grains to establish the gluten-free oats. The resulting oats can be used to make a wide range of gluten-free oat food products, including cereal and granola products.

13 Claims, 3 Drawing Sheets

(56) References Cited

U.S. PATENT DOCUMENTS

| | | | |
|---|---|---|---|
| 4,208,274 | A | 6/1980 | Satake et al. |
| 4,384,953 | A | 5/1983 | Christian |
| 4,466,542 | A | 8/1984 | Oetiker et al. |
| 4,840,727 | A | 6/1989 | Humphrey |
| 5,019,242 | A | 5/1991 | Donelson |
| 5,301,811 | A | 4/1994 | Mueller |
| 5,597,076 | A | 1/1997 | Kershner |
| 5,860,531 | A | 1/1999 | Satoru et al. |
| 6,113,908 | A | 9/2000 | Paton et al. |
| 6,253,928 | B1 | 7/2001 | Weber |
| 6,602,130 | B1 | 8/2003 | Manning et al. |
| 7,891,498 | B2 | 2/2011 | Ernst |
| 2005/0089602 | A1 | 4/2005 | Kvist et al. |
| 2009/0311376 | A1 | 12/2009 | Rao et al. |

\* cited by examiner

METHOD AND SYSTEM FOR PRODUCING GLUTEN-FREE OATS

FIELD OF THE INVENTION

The invention generally pertains to the sorting of grains and, more particularly, a method and system for separating oat grains from foreign grains and other contaminants in order to produce gluten-free oats, i.e., oats having gluten levels below 20 ppm and, more preferably, less than 10 ppm.

BACKGROUND OF THE INVENTION

Sensitivity to gluten is estimated at afflicting up to 2% of the population. In fact, based on the increased awareness of Celiac disease and gluten intolerance, gluten levels in certain foods can be a limiting factor in consumption. Oats themselves do not contain gluten. However, oats cultivated in North America, Europe and even other parts of the world are commonly contaminated by gluten containing foreign grains, including wheat, barley, rye and triticale. These foreign grains typically exhibit about 14% by weight protein, with 40% of the protein being attributable to gluten such that approximately 5.6% by weight of the grains is gluten. This contamination is commonly known to come from various sources, mainly from the rotation of small grain crops on the same land, with residual contaminating seeds germinating with a seeded oat crop. In addition, contamination from other grains which are harvested, transported, stored and merchandized in common with oats is a contributing factor. As a result, it is not uncommon to find from 0.5% to 5.0% of these other grains mixed with commercially marketed oats. Therefore, absent dedicating land, harvesting equipment, transporting vehicles, storage units, packaging and production facilities, and the like only for use in connection with oats, cross contamination is inevitable.

Although the federal government has not finalized rules for labeling products "gluten-free", the American regulations will likely be similar to the Codex rules established in Europe, which stipulate a maximum of 20 ppm gluten in "gluten-free" food products. Based on draft proposals from the United States Food and Drug Administration, oats will continue to be eligible for gluten-free labeling as long as they are substantially free of foreign seeds. With this in mind, separating oats from foreign grains and other contaminants is required if oat products are to be produced to mandated gluten levels.

Known grain sorting techniques typically rely on mechanical or optical systems. Mechanical systems are considered advantageous generally based on their simplicity and cost benefits. However, simply put, previous attempts to employ mechanical sorting machines have failed to consistently deliver oats without undesirably high levels of gluten contaminants. Optical systems generally employ multiple cameras to view grain falling toward a grain rejection mechanism. In some machines, duplicate optical units are positioned on opposite sides of a sorter to provide simultaneous images of opposing sides of the grains. In general, optical sorters have higher associated costs and known optical sorters also have not been sufficiently effective in achieving the reduced gluten levels desired in accordance with the invention. Therefore, there is seen to exist a need to provide a method and apparatus for effectively and efficiently decontaminating oat grains in order to produce gluten-free oats useable for various purposes, particularly as an oat ingredient in the production of various food products, including cereal and granola.

SUMMARY OF THE INVENTION

The present invention is directed to a method and system for removing foreign grains from oat grains to establish gluten-free oats, i.e., oat grains having gluten levels below 20 ppm and, more preferably, below 10 ppm. The present invention relies upon performing a series of differentiation operations on a combination of grains, including gluten-free oats and foreign, or gluten containing, grains. In addition to initial differentiation operations, a re-shaping operation is performed to compress the oat grains but not the foreign grains. Thereafter, the compressed oat grains are separated from the foreign grains to establish the gluten-free oats. In accordance with one preferred embodiment, this re-shaping is performed by directing the overall combination of grains through compression rollers, wherein one of the rollers has an elastomeric outer surface. Given different hardnesses of the various grains, this re-shaping operation functions to thin out or flatten the oat grains, but not the remaining foreign grains.

The initial series of differentiation operations essentially include cleaning and sizing operations employing mechanical devices for aspirating, width grading, length grading, density separating, de-hulling and the like. The initial differentiation operations are preferably performed in series on all the grains, while a subsequent set of operations, including the re-shaping or compression operation is preferably performed in parallel stages for multiple different sized groupings of the combination of grains, with the compressed oats of the various groupings being later recombined. The resulting oats can be used to make a wide range of gluten-free oat food products, including cereal and granola products.

Additional objects, features and advantages of the invention will become more readily apparent from the following detailed description of preferred embodiments thereof when taken in conjunction with the drawings wherein like reference numerals refer to corresponding steps and structure in the several views.

DETAILED DESCRIPTION OF INVENTION

As indicated above, the invention is directed to a method and system for separating oat grains from foreign grains and other contaminants in order to produce gluten-free oats. By "gluten-free", it is meant that the oats have gluten levels below 20 ppm and, more preferably, less than 10 ppm. In general, the method and system of the invention is practiced in two distinct parts to reduce starting gluten levels of about 1000-1200 ppm in the oats to achieve gluten-free oats for consumer food production. The first step employs the use of a series of differentiation operations on a combination of grains, with these operations including various cleaning and sizing stages performed on the combination grains which can include whole oats. The second overall aspect of the method and system focuses on modifying the shape of the oat grains after de-hulling. This change in shape of the oat grains allows for the removal of the gluten bearing grains from the oat grain stream to establish oats having a gluten level below at least 20 ppm and, actually, less than 10 ppm.

Figure 1:
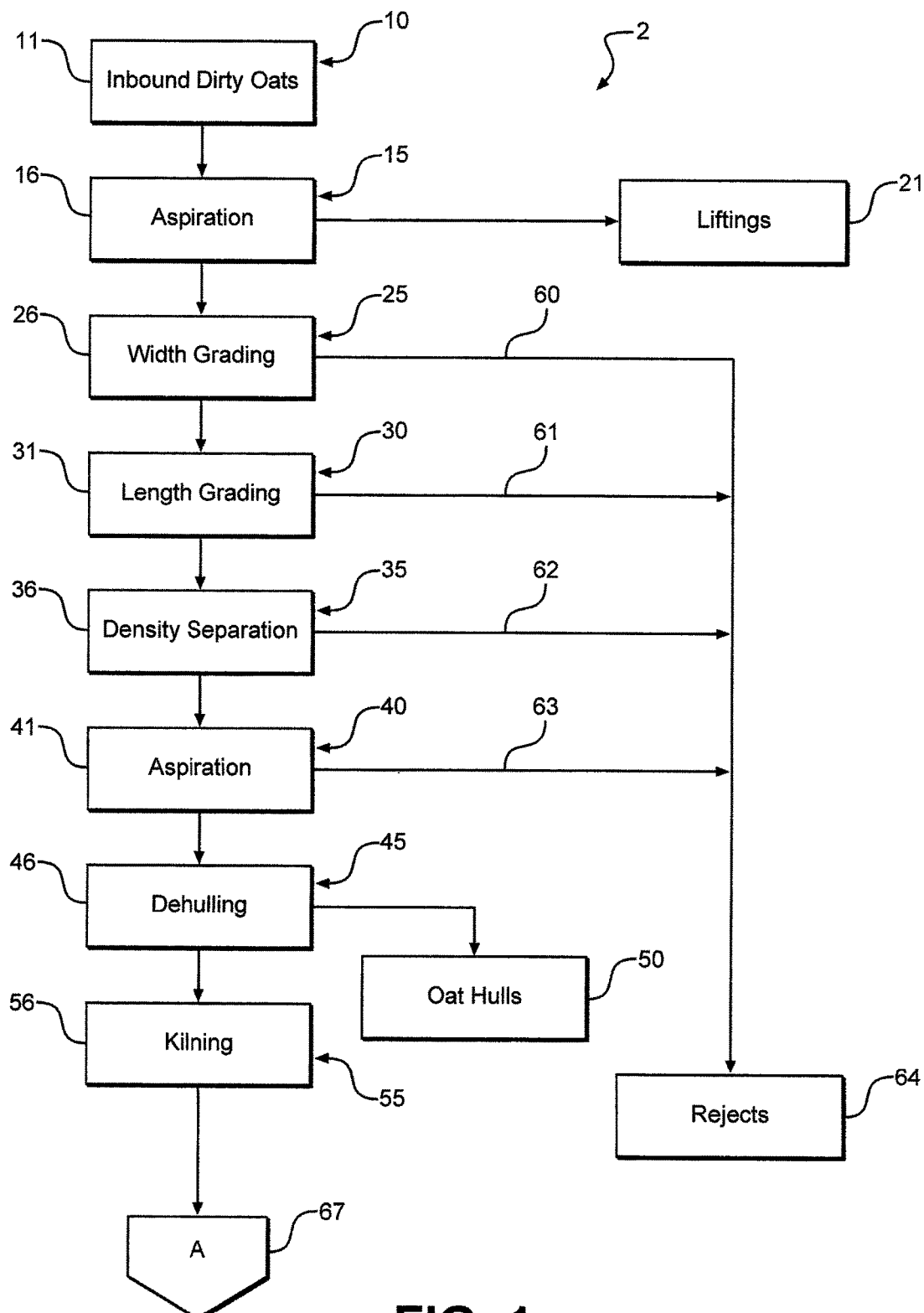
FIG. 1 is a flow chart representing a first series of operations performed in connection with the method and system of the invention.

With initial reference to FIG. 1, the system and method of the invention is generally indicated at 2. The starting point is indicated at step 10 wherein a supply of inbound dirty oats 11 are received. Inbound dirty oats 11 include a combination of grains, including oat grains and various foreign grains, as well as potentially other contaminants. As the oat grains themselves are gluten-free, it is desired to separate the oat grains from the foreign grains and other contaminants. As shown, the inbound dirty oats 11 are processed through an initial aspiration step at 15. Initial aspiration step 15 is preferably performed using a channel aspirator 16 designed to remove any chaff, dust or empty oats from the overall combination of grains. Collectively, the chaff, dust and/or empty oats constitute liftings 21 which are removed from the overall stream.

Following aspiration step 15, the combination of grains proceed to various grading steps, shown to include a width grading step 25 employing a width grader 26, length grading 30 employing a length grader 31, density separation 35 including a density separator 36 and an addition aspiration step 40 including an aspirator 41. Although various known grading and separation equipment can be employed, one embodiment of the invention utilizes a slotted tri-bar screen in a cylinder as width grader 26. In a particular embodiment, the invention has been carried out utilizing a 9/64×¾ slotted tri-bar screen-type width grader 26. In a similar manner, a known length grader 31 can be employed, particularly to separate stub oats from the overall combination of grains as such stub oats are difficult to de-hull, as will be discussed more fully below. Density separator 36 is mainly employed to remove any stones and other heavy foreign grains from the combination of grains. In any case, this series of differentiation operations are followed by a further, de-hulling step 45 wherein de-hulling equipment 46 is employed. In general, de-hulling is commonly known in the art and essentially used in all oat milling operations to establish oat groats which are sent to a bin for further processing. As shown in this figure, the oat hulls are indicated at 50. After de-hulling step 45, the combination of grains are shown to undergo a kilning process 55 in order to enable unsized oat groats to pass through heat and moisture treating structure 56 to balance moisture, as well as to stabilize the oat grains. This overall process results in various collection steps indicated at 60-63 to establish rejected grains indicated at 64 and an initially processed combination of grains indicated at 67. At this point, the series of differentiation operations has preferably reduced the percentage of foreign grains to less than about 0.035% by weight versus the oat grains based on the 20 ppm level.

Figure 2:
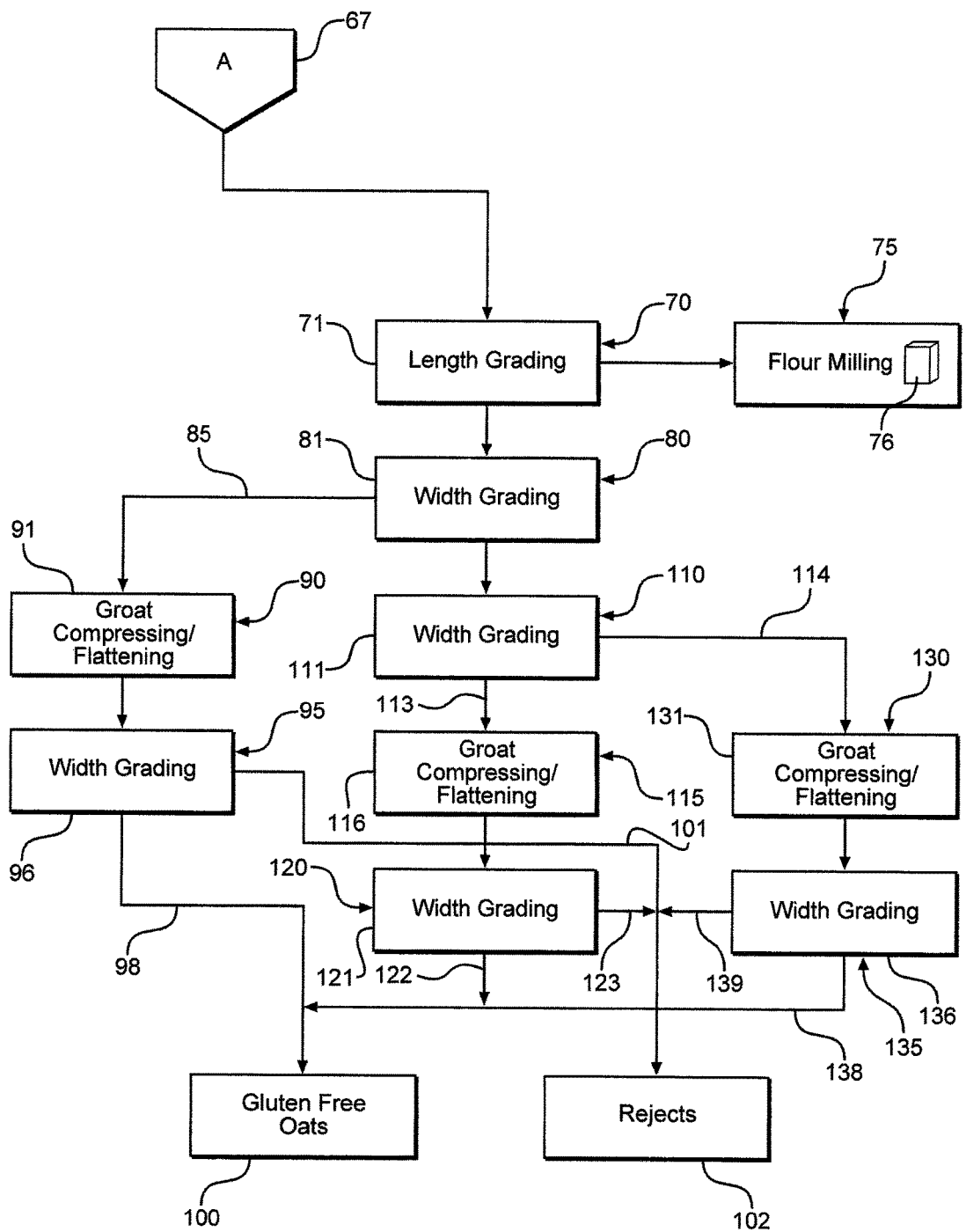
FIG. 2 is a flow chart representing a second series of operations performed in connection with the method and system of the invention.

Reference will now be made to FIG. 2 in describing the second part of the method and system referenced above. As will become more fully evident below, an important part of this invention concerns the changing of the shape of the oat grains so the oat grains can be separated from all the remaining gluten containing or contaminating grains. As illustrated, the initially processed combination of grains 67 further proceed to a length grading step 70 wherein a length grader 71 employs a screen from sizing purposes. As indicated at step 75, the length graded grains not used in connection with the remainder of the invention can be milled into flour such as indicated at 76. Following length grading step 70, a width grading step 80 is performed. Actually, as will be detailed more fully below, this embodiment of the invention preferably performs three width grading operations to establish three different size groupings of the combination of grains for further processing.

Following the operation through width grader 81 there is a first output 85 that is directed for further working of the combination of grains and, more specifically, a re-shaping of the oat grains in the combination of grains by directing first output 85 to a first groat compression step 90 having a first groat compressor or flattener 91. Further details of groat compressor 91 will be discussed further below with reference to FIG. 3. At this point, it is merely important to note that the shape of the oat groat is affected by running first output 85 through compressor 91, while the other grains in the combination of grains are not re-shaped. Therefore, following compression step 90, the oat grains will have been compressed and re-shaped, but not the foreign grains. In general, this important step in the operation relies on the difference in the resistance to compression between the oat grains and the other foreign grains in order to reduce the width of the oat grains while allowing the other grains to remain unchanged in width. Here, an inherent difference in hardness is used to effect a change in the shape of the oat grain or groat while not affecting the shape or size of the other grains. That is, the oat grains are much softer than the other grains and can be flattened in relation to the other grains which, on the other hand, are highly resistant to being flattened. After compression step 90, the combination of grains, including the re-shaped oat grains, are directed through a width grading step 95 wherein a width grader 96 defines a separation apparatus which separates the re-shaped oat grains from the foreign grains, with one output being conveyed, as indicated at 98, to establish a supply of gluten-free oats 100. At the same time, another output from width grader 96 is conveyed at 101 to establish the rejected foreign grains indicated at 102.

As indicated above, the preferred embodiment of the invention establishes three different size groups for processing in accordance overall invention. To this end, a portion of the output from width grader 81 also is conveyed to a width grading step 110 which also includes width grading equipment 111. The output from width grading equipment 111 establishes a second output 113 and a third output 114. Much in the same manner as going through compression step 90 and width grading step 95, the second and third outputs 113 and 114 also proceed in a corresponding manner. More specifically, second output 113 has performed thereon a groat compressing/flattening step indicated at 115 utilizing a groat compressor 116 similar to that of groat compressor 91. From step 115, this compressed combination of grains proceeds to a width grading step 120 wherein a width grader 121 establishes an output 122 of gluten-free oats 100, as well as an output 123 of rejected, contaminated grains 102. Again, in a similar fashion, the third output 114 proceeds to a oat compression/flattening step 130 wherein a groat compressor 131 re-shapes the oat grains which is then directed to a width grading step 135 wherein a width grader 136 establishes an output 138 of gluten-free oats 100 and another output 139 of contaminated grains 102.

It has been found that contaminated oat grains can be processed in accordance with the invention to establish gluten-free oats 100 which actually have a gluten level of less than 10 ppm. Although current standards stipulate a maximum of 20 ppm gluten for a "gluten-free" food product, the present invention significantly improves upon this maximum level. In any case, the separated gluten-free oats 100 and remaining, contaminated grains 102 represented in FIG. 2 can be further processed to produce a wide range of food products. For instance, oats 100 can be used to produce various gluten-free food products, including cereals and granola-based products.

Although a wide range of processing equipment can be utilized in accordance with the invention to perform the series of differentiation operations as set forth above, one embodiment of the invention utilizes a 5/64 inscribed triangular flat screen for length grader 71 and tri-bar cylinder graders for width graders 81, 96 and 111. More specifically, the tri-bar cylinder graders employed in connection with this aspect of the invention incorporate three different size groupings, such as overage from a 6/64 slot, overage from a 5/64 slot and overage from another 5/64 slot. Of course, these specific types of length and width graders are merely disclosed for the sake of completeness and other types of cleaning and sizing equipment could be employed without departing from the spirit of the invention.

Figure 3:
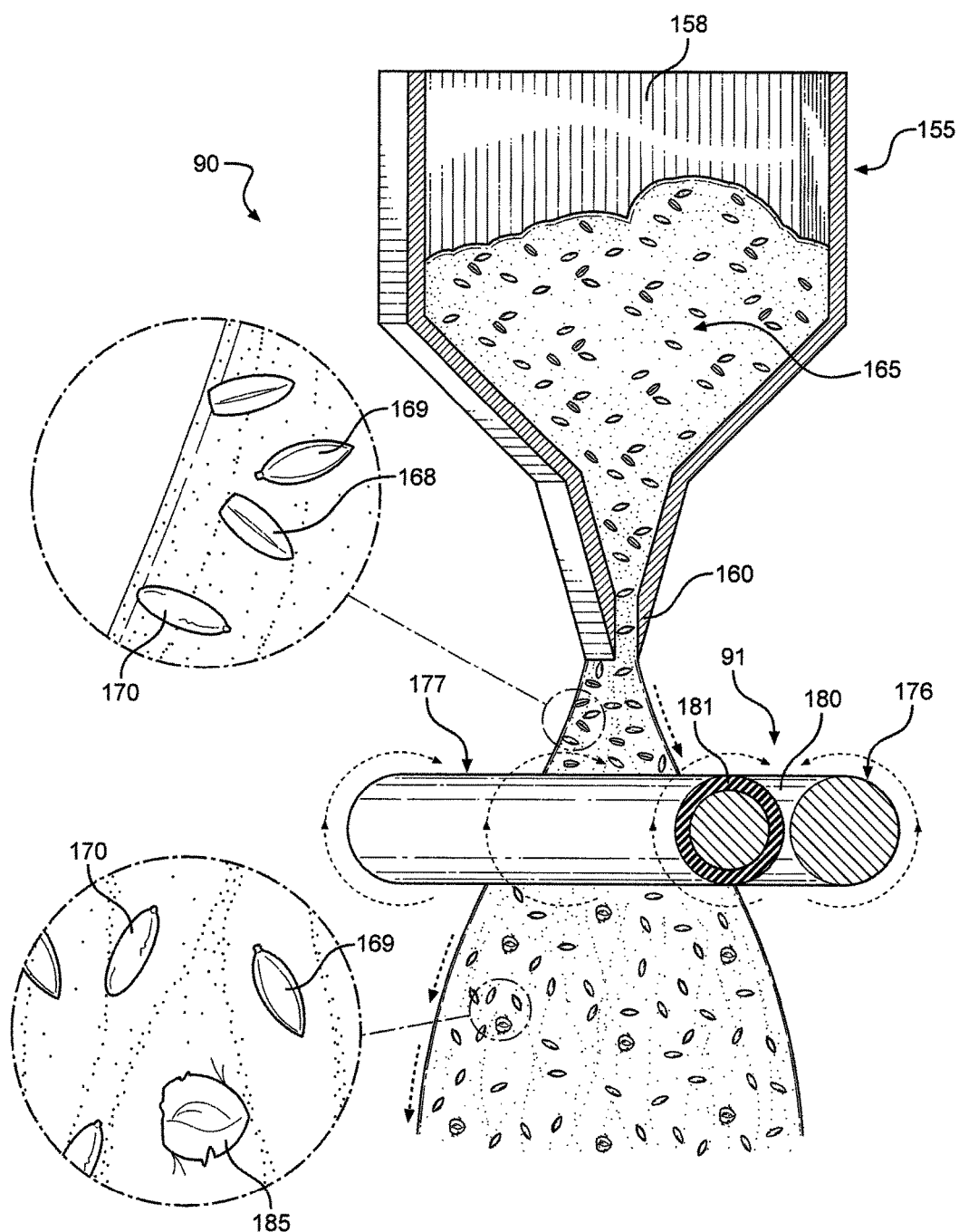
FIG. 3 illustrates an oat groat compressor arrangement employed in the method and system of the invention.

In the same spirit, the groat compressing equipment employed in the method and system of the invention can also vary. FIG. 3 shows one embodiment wherein a hopper 155 includes an enlarged container portion 158 and a discharge portion 160. A combination of grains 165 is delivered to enlarged container portion 158 and directed through discharge portion 160. Although the combination of grains 165 can vary, these grains are shown to include oat grains 168, barley grains 169 and wheat grains 170. From discharge portion 160, the combination of grains 165 are directed through the groat compressor (shown here as groat compressor 91) which is defined by a first roller 176 in combination with a second roller 177. First roller 176 has an outer surface 180 which is extremely hard. For instance, first roller 176 can be constituted by a hard plastic or metal roller such that outer surface 180 is basically incompressible. On the other hand, second roller 177 includes an outer surface 181 which is defined by an elastomeric material. The combination of grains 165 are directed between first and second rollers 176 and 177 which causes the oat grains to flatten out as indicated at 185 in this figure. In accordance with a preferred embodiment of the invention, the flattened oat groat has been reduced in thickness by 0.020-0.030 of an inch. On the other hand, the barley grain 169 and the wheat grain 170 are much harder and resistant to compression. Therefore, when directed between first and second rollers 176 and 177, the barley grains 169 and wheat grains 170 sink into the elastomeric outer surface 181 and are not compressed, thereby flowing through groat compressor 91 the same size as in the combination of grains 165. By establishing flattened oat grains 185, the flattened oat grains 185 are now thinner than the other grains and can be separated by the respective width graders 96, 121, 136, each of which has the tendency to stand the compressed oat grains 185 on edge and allow them to drop through slots while the barley grains 169 and wheat grains 170 are retained on a screen and instead are separately collected. Obviously, by establishing separate streams, the smaller the width of the oat grains and other grains, the smaller the width of the final screen that is used to allow the passage of the compressed oat grains in establishing the gluten-free oats 100.

Based on the above, it should be apparent that the present invention establishes gluten-free oats without the need for any expensive or complicated optical equipment previously relied upon. Instead, the present invention is seen to advantageously rely on mechanical grain sorting techniques. This particular arrangement has been found to have certain costs and effectiveness advantages, while also having certain restrictions. For instance, it is been found that the gluten-free oats need to be conditioned as quickly as possible, at least in a 24 hour period. Mainly, this quick conditioning is required due to the increased exposure to oxygen as a result of the crushing, flattening or flaking effect of the overall process. On the other hand, due to the increase in uniformity and the reduced groat thickness, it is considered easier to condition the resulting oat products, mainly due to the fact that more complete and faster moisture and heat penetration can be achieved. Therefore, compressing the oat groats in accordance with the present invention also advantageously results in easier cooking associated in making oat flour and increases the conditioning rates, potentially above 170 pounds per minute.

Although described with respect to the preferred embodiments of the invention, it should be readily understood that various changes and/or modifications can be made to the invention without departing from the spirit thereof. In particular, it should be recognized that the disclosed embodiments set forth a series of differentiation operations and provide for multiple, parallel-arranged groat flattening and grading stages. It should certainly be realized that one main focus of the invention centers on at least one flattening or compression operation, followed by a separation step, such that the actual number and type of differentiation operations can vary in accordance with the overall invention, particularly depending on the amount of initial contamination. In addition, the manner and structure employed in re-shaping the oat grains can also vary in accordance with the invention. For instance, the roller assembly described above could be used to flatten oat grains as the grains travel along a conveyor. In any case, the invention is only intended to be limited by the scope of the following claims.

The invention claimed is:

1. A method of producing gluten-free oats from a combination of grains comprising:
   performing a series of differentiation operations on the combination of grains to establish an initially processed combination of grains;
   working the initially processed combination of grains to establish compressed oat grains; and
   separating the compressed oat grains from other grains of the initially processed combination of grains to establish gluten-free oats.

2. The method of claim 1, wherein performing the series of differentiation operations includes conducting cleaning and sizing operations on the combination of grains.

3. The method of claim 2, wherein the series of differentiation operations includes de-hulling the oat grains in the combination of grains.

4. The method of claim 2, wherein performing the series of differentiation operations reduces a percentage of the other grains to less than approximately 0.035% by weight versus the oat grains.

5. The method of claim 2, wherein the series of differentiation operations constitutes mechanical operations selected from the group consisting of aspiration, width grading, length grading, density separation, de-hulling and combinations thereof.

6. The method of claim 1, wherein working the initially processed combination of grains establishes the compressed oat grains which are thinner than the other grains of the combination of grains.

7. The method of claim 6, wherein working the initially processed combination of grains includes directing the combination of grains through compression rollers.

8. The method of claim 7, wherein the compression rollers include at least one elastomeric roller which contributes in establishing the compressed oat grains while retaining a shape of the other grains.

9. The method of claim 7, wherein the oat grains are reduced in thickness by at least 0.020 of an inch by being directed through the compression rollers.

10. The method of claim 1, wherein separating the compressed oat grains includes grade separating the oat grains from the other grains.

11. The method of claim 1, further comprising: conditioning the oat grains immediately after separation to minimize oxygen exposure.

12. A method of producing gluten-free oats from a combination of grains comprising:
   performing a series of differentiation operations on the combination of grains, including oat grains and foreign grains, to establish an initially processed combination of grains;
   working the initially processed combination of grains to re-shape the oat grains while not re-shaping the foreign grains; and
   separating the oat grains from the foreign grains to establish gluten-free oats.

13. The method of claim 12, wherein working the initially processed combination of grains to re-shape the oat grains constitutes flattening the oat grains.

* * * * *